United States Patent
Takayasu et al.

(10) Patent No.: US 10,053,762 B2
(45) Date of Patent: Aug. 21, 2018

(54) METHOD FOR PRODUCING SURFACE-TREATED METAL TITANIUM MATERIAL OR TITANIUM ALLOY MATERIAL, AND SURFACE-TREATED MATERIAL

(71) Applicants: SHOWA CO., LTD., Nara (JP); MORI KOSAN CO., LTD., Osaka (JP)

(72) Inventors: Teruki Takayasu, Nara (JP); Shingo Mori, Osaka (JP); Kinji Onoda, Nara (JP)

(73) Assignees: SHOWA CO., LTD. (JP); MORI KOSAN CO., LTD. (JP)

( * ) Notice: Subject to any disclaimer, the term of this patent is extended or adjusted under 35 U.S.C. 154(b) by 35 days.

(21) Appl. No.: 14/770,737

(22) PCT Filed: Feb. 20, 2014

(86) PCT No.: PCT/JP2014/054027
§ 371 (c)(1),
(2) Date: Aug. 26, 2015

(87) PCT Pub. No.: WO2014/132874
PCT Pub. Date: Sep. 4, 2014

(65) Prior Publication Data
US 2016/0002765 A1    Jan. 7, 2016

(30) Foreign Application Priority Data
Feb. 26, 2013   (JP) .................................. 2013-035311

(51) Int. Cl.
*C23C 8/10* (2006.01)
*C23C 8/24* (2006.01)
(Continued)

(52) U.S. Cl.
CPC ............... *C23C 8/10* (2013.01); *B01J 21/063* (2013.01); *B01J 35/004* (2013.01);
(Continued)

(58) Field of Classification Search
CPC .... C23C 8/10; C23C 8/24; C23C 8/34; C23C 28/042; C10M 103/06; C10M 103/04;
(Continued)

(56) References Cited

U.S. PATENT DOCUMENTS 4,473,029 A   9/1984  Fritz et al.
4,602,863 A   7/1986  Fritz et al.
(Continued)

FOREIGN PATENT DOCUMENTS

CN    101922037 B    2/2012
EP    2438990 A1     4/2012
(Continued)

OTHER PUBLICATIONS

English Machine Translation of JP 8-246192 A.*
(Continued)

*Primary Examiner* — James Goloboy
(74) *Attorney, Agent, or Firm* — Nexsen Pruet, LLC; John B. Hardaway, III

(57) ABSTRACT

A material that is useful as a wear-resistant member, a highly functional photocatalytic material, a photoelectric conversion element material, etc., is produced without the need for complicated processes or complicated handling, which are problems of the prior art. Provided is a method for producing a surface-treated metallic titanium material or titanium alloy material, the method comprising the steps of (1) forming titanium nitride on the surface of a metallic titanium material, and (2) heating the metallic titanium material with titanium nitride formed on the surface thereof obtained in step (1) in an oxidizing atmosphere. Also provided is a
(Continued)

method for producing a surface-treated metallic titanium material or titanium alloy material, the method comprising, between steps (1) and (2) above, the step of anodizing the metallic titanium material with titanium nitride formed on the surface thereof obtained in step (1) in an electrolyte solution that does not have an etching effect on titanium, thereby forming a titanium oxide film. Further provided is a surface-treated material.

3 Claims, 5 Drawing Sheets

(51) Int. Cl.
  C25D 11/26    (2006.01)
  C10M 103/04   (2006.01)
  C10M 103/06   (2006.01)
  C23C 8/34     (2006.01)
  C23C 28/04    (2006.01)
  B01J 21/06    (2006.01)
  B01J 35/00    (2006.01)
  C23F 17/00    (2006.01)
  C25D 7/00     (2006.01)
  H01G 9/20     (2006.01)

(52) U.S. Cl.
  CPC ........ *C10M 103/04* (2013.01); *C10M 103/06* (2013.01); *C23C 8/24* (2013.01); *C23C 8/34* (2013.01); *C23C 28/042* (2013.01); *C23F 17/00* (2013.01); *C25D 7/00* (2013.01); *C25D 11/26* (2013.01); *H01G 9/2031* (2013.01); *C10M 2201/053* (2013.01); *C10M 2201/0623* (2013.01)

(58) Field of Classification Search
  CPC .... C10M 2201/053; C10M 2201/0623; C25D 7/00; C25D 11/26; C23F 17/00; H01G 9/00; B01J 21/063; B01J 35/004

USPC ....................................................... 508/300
  See application file for complete search history.

(56)  References Cited

U.S. PATENT DOCUMENTS

| | | | | |
|---|---|---|---|---|
| 4,793,871 | A | * | 12/1988 | Dawes ...................... C23C 8/02 148/218 |
| 6,093,259 | A | | 7/2000 | Watanabe et al. |
| 8,865,612 | B2 | * | 10/2014 | Kaneko ................. B01J 21/063 428/457 |
| 2009/0035213 | A1 | * | 2/2009 | Takayasu ............... B01J 21/063 423/609 |
| 2012/0135855 | A1 | | 5/2012 | Kaneko et al. |

FOREIGN PATENT DOCUMENTS

| | | | | |
|---|---|---|---|---|
| JP | H05-009790 | A | | 1/1993 |
| JP | 08246192 | A | * | 9/1996 |
| JP | H08-246192 | A | | 9/1996 |
| JP | H09-263929 | A | | 10/1997 |
| JP | H11-124665 | A | | 5/1999 |
| JP | H11-279749 | A | | 10/1999 |
| JP | H11-315398 | A | | 11/1999 |
| JP | 2001-199725 | A | | 7/2001 |
| JP | 2005-240139 | A | | 9/2005 |
| JP | 2006-299389 | A | | 11/2006 |
| JP | WO 2010140700 | A1 | * | 12/2010 ............ B01J 21/063 |
| WO | WO 2007/023543 | A1 | | 3/2007 |

OTHER PUBLICATIONS

Machine translation of Fujishima reference WO JPH 08246192.*
International Search Report dated May 13, 2014, ISA/JP, PCT/JP2014/054027.
Mauger, Jeremy; EP14757395; Supplementary European Search Report; EPO; 6 Pages; dated Nov. 7, 2016.

* cited by examiner

METHOD FOR PRODUCING SURFACE-TREATED METAL TITANIUM MATERIAL OR TITANIUM ALLOY MATERIAL, AND SURFACE-TREATED MATERIAL

TECHNICAL FIELD

The present invention relates to a method for producing a surface-treated metallic titanium material or titanium alloy material, and also relates to a surface-treated material.

BACKGROUND ART

Titanium oxide can convert light energy into chemical energy or electrical energy. Therefore, titanium oxide is expected to be applied to photocatalysts that decompose various toxic substances, and to dye-sensitized solar cells that have been attracting attention as next-generation solar cells.

Titanium oxide has three types of crystal structures: rutile, brookite, and anatase forms. Among these three forms, anatase-type titanium oxide is known to have excellent photocatalytic characteristics and excellent photoelectric transfer characteristics for dye-sensitized solar cells.

A method for producing a titanium oxide film on the surface of metallic titanium or titanium alloy (an alloy comprising titanium as a main component) is conventionally known. Another known method is to anodize metallic titanium or titanium alloy in a dilute solution of an inorganic acid (e.g., phosphoric acid) that does not have an etching effect on titanium.

However, these methods only result in the formation of amorphous titanium oxide, which does not have a crystal structure. Amorphous titanium oxide is known to have no photocatalytic characteristics and no photoelectric transfer characteristics for dye-sensitized solar cells.

Moreover, a method for producing an anatase-type titanium oxide film by anodization has been considered.

PTL 1 proposes a method comprising anodizing a titanium plate in a dilute acid solution of phosphoric acid or the like that does not have an etching effect on titanium, and then heating the plate under an oxidizing atmosphere.

PTL 2 proposes a method comprising anodizing titanium immersed in an electrolytic bath comprising sulfuric acid or the like that has an etching effect on titanium, and then further anodizing the titanium after adding ammonium fluoride to the electrolytic bath.

PTL 3 proposes a method comprising forming titanium nitride on the surface of titanium, then immersing the titanium in an electrolyte solution containing an inorganic acid or the like that has an etching effect on titanium, and performing anodization by applying a voltage higher than the spark discharge generating voltage.

Furthermore, the production of frictional sliding members having wear resistance using titanium nitride has been considered.

PTL 4 proposes a method for producing highly oriented titanium nitride, the method comprising ionizing metallic titanium by arc discharge, and reacting the metallic titanium with nitrogen gas, thereby forming a crystalline thin film of titanium nitride on the surface of a substrate.

That is, only the following methods were known as prior art: a method comprising forming titanium nitride on the surface of titanium, and then performing anodization by applying a voltage higher than the spark discharge generating voltage in an electrolyte solution containing an inorganic acid or the like that has an etching effect on titanium; and a method comprising anodizing a titanium plate in a dilute acid solution of phosphoric acid or the like that does not have an etching effect on titanium, and then heating the plate under an oxidizing atmosphere.

However, these methods had the following problems. They were impractical due to their complicated processes; strong acid having a high risk of having an etching effect on titanium was used in anodization; high current and high voltage were required; and their handling was complicated because harmful gas and mist were generated during handling.

CITATION LIST

Patent Literature

PTL 1: JPH08-246192A
PTL 2: JPH11-315398A
PTL 3: JP2005-240139A
PTL 4: JPH11-124665A

SUMMARY OF INVENTION

Technical Problem

An object of the present invention is to produce a material that is useful as a wear-resistant material, a high performance photocatalytic material, a photovoltaic material, etc., without the need for complicated processes or complicated handling, which are the problems of the prior art.

Solution to Problem

As a result of extensive research to achieve the above object, the present inventors found that useful materials having wear resistance can be produced by a surface treatment method comprising (1) forming titanium nitride on the surface of metallic titanium materials or titanium alloy (an alloy comprising titanium as a main component) materials, and then (2) performing heat treatment in an oxidizing atmosphere.

The present inventors also found that materials useful as wear-resistant materials, highly functional photocatalytic materials, photoelectric conversion element materials, etc., can be produced by performing a surface treatment method comprising (1) forming titanium nitride on the surface of metallic titanium materials or titanium alloy (an alloy comprising titanium as a main component) materials; (2) then performing anodization in an electrolyte solution that does not have an etching effect on titanium, thereby forming a titanium oxide film; and (3) performing heat treatment in an oxidizing atmosphere.

The surface-treated metallic titanium materials or titanium alloy materials can be applied to wear-resistant materials, highly functional photocatalytic materials, photoelectric conversion element materials, etc. The surface-treated materials have excellent sliding properties and wear resistance.

Specifically, the present invention relates to a method for producing a surface-treated metallic titanium material or titanium alloy material, and a method for treating the surface of a metallic titanium material or titanium alloy material. The present invention also relates to a method for producing a material that is useful as a photocatalytic material, a photoelectric conversion element material, etc.; a method for producing a material having excellent sliding properties and wear resistance; and surface-treated materials produced by these production methods.

Item 1. A method for producing a surface-treated metallic titanium material or titanium alloy material used for an application selected from the group consisting of photocatalytic materials, photoelectric conversion element materials, slide-resistant materials, and wear-resistant materials, the method comprising the steps of:

(1) forming titanium nitride on the surface of a metallic titanium material or a titanium alloy material by one treatment method selected from the group consisting of heat treatment under an ammonia gas atmosphere and heat treatment under a nitrogen gas atmosphere, at a heating temperature of 750° C. or more;

(2) anodizing the metallic titanium material or titanium alloy material with the titanium nitride formed on the surface thereof obtained in step (1) by applying a voltage of 10 V or more in an electrolyte solution that does not have an etching effect on titanium, thereby forming a titanium oxide film; and (3) heating the metallic titanium material or titanium alloy material with the titanium oxide film formed on the surface thereof obtained in step (2) at a temperature of 400° C. or more in an atmosphere selected from an air oxidizing atmosphere, an atmosphere of a mixture of oxygen gas and nitrogen gas, and an oxygen gas atmosphere.

Item 2. The production method according to Item 1, wherein the heat treatment under a nitrogen gas atmosphere is performed in the presence of an oxygen-trapping agent.

Item 3. The production method according to Item 1 or 2, wherein the electrolyte solution that does not have an etching effect on titanium used in anodization is an electrolyte solution containing at least one compound selected from the group consisting of inorganic acids, organic acids, and salts thereof.

Item 4. The production method according to Item 3, wherein the at least one compound selected from the group consisting of inorganic acids, organic acids, and salts thereof is at least one compound selected from the group consisting of phosphoric acid and phosphate.

Item 5. The production method according to any one of Items 1 to 4, wherein the voltage applied in the anodization of step (2) is 50 to 300 V.

Item 6. The production method according to any one of Items 1 to 5, wherein the temperature of the heat treatment performed in the atmosphere of step (3) is 400° C. to 700° C.

Item 7. The production method according to any one of Items 1 to 6, wherein the titanium oxide film formed by anodization is a crystalline titanium oxide film.

Item 8. The production method according to Item 7, wherein the crystalline titanium oxide film is an anatase-type titanium oxide film.

Item 9. A surface-treated metallic titanium material or titanium alloy material produced by the production method according to any one of Items 1 to 8, and used for an application selected from the group consisting of photocatalytic materials, photoelectric conversion element materials, slide-resistant materials, and wear-resistant materials.

Item 10. A photocatalytic material or photoelectric conversion element material comprising the surface-treated metallic titanium material or titanium alloy material according to Item 9.

Item 11. A frictional sliding material or wear-resistant material comprising the surface-treated metallic titanium material or titanium alloy material according to Item 9.

Item 12. A method for producing a surface-treated metallic titanium material or titanium alloy material, the method comprising the steps of:

(1) forming titanium nitride on the surface of a metallic titanium material or a titanium alloy material; and (2) heating the metallic titanium material or titanium alloy material with the titanium nitride formed on the surface thereof obtained in step (1) in an air oxidizing atmosphere.

Item 13. The method for producing a surface-treated metallic titanium material or titanium alloy material according to Item 12, the method comprising the steps of:

(1) forming titanium nitride on the surface of a metallic titanium material or a titanium alloy material;

(2) anodizing the metallic titanium material or titanium alloy material with the titanium nitride formed on the surface thereof obtained in step (1) in an electrolyte solution that does not have an etching effect on titanium, thereby forming a titanium oxide film; and (3) heating the metallic titanium material or titanium alloy material with the titanium oxide film formed on the surface thereof obtained in step (2) in an oxidizing atmosphere.

Item 14. The production method according to Item 12 or 13, wherein the step of forming titanium nitride is performed by one treatment method selected from the group consisting of PVD treatment, CVD treatment, spraying treatment, heat treatment under an ammonia gas atmosphere, and heat treatment under a nitrogen gas atmosphere.

Item 15. The production method according to Item 14, wherein the heat treatment under a nitrogen gas atmosphere is performed in the presence of an oxygen-trapping agent.

Item 16. The production method according to Item 13, wherein the electrolyte solution that does not have an etching effect on titanium used in anodization is an electrolyte solution containing at least one compound selected from the group consisting of inorganic acids, organic acids, and salts thereof.

Item 17. The production method according to Item 16, wherein the at least one compound selected from the group consisting of inorganic acids, organic acids, and salts thereof is at least one compound selected from the group consisting of phosphoric acid and phosphate.

Item 18. The production method according to any one of Items 12 to 17, wherein the temperature of the heat treatment performed in an oxidizing atmosphere is 300° C. to 700° C.

Item 19. The production method according to Item 13, 16, or 17, wherein the titanium oxide film formed by anodization is a crystalline titanium oxide film.

Item 20. The production method according to Item 19, wherein the crystalline titanium oxide film is an anatase-type titanium oxide film.

Item 21. A surface-treated metallic titanium material or titanium alloy material produced by the production method according to any one of Items 12 to 20.

Item 22. A photocatalytic material or photoelectric conversion element material comprising the surface-treated metallic titanium material or titanium alloy material according to Item 21.

Item 23. A frictional sliding material or wear-resistant material comprising the surface-treated metallic titanium material or titanium alloy material according to Item 21.

Advantageous Effects of Invention

The present invention can produce a material that is useful as a wear-resistant material, a highly functional photocatalytic material, a photoelectric conversion element material, etc., without the need for complicated processes or complicated handling, which are the problems of the prior art.

DESCRIPTION OF EMBODIMENTS

Figure 1:
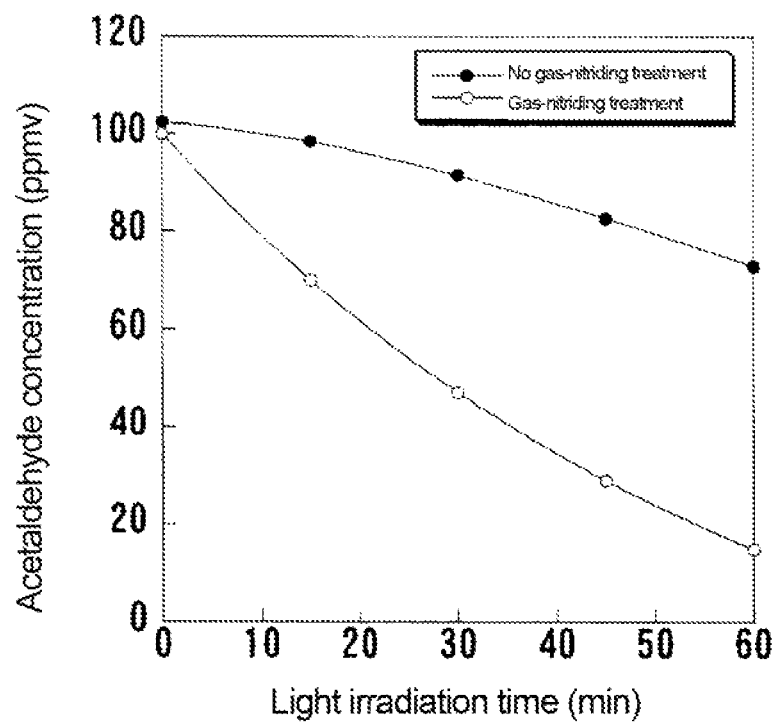
FIG. 1 shows the photocatalytic activity of the titanium material of Example 1.

The present invention is described in detail below. In the present specification, metallic titanium materials and titanium alloy materials are also referred to as simply "titanium materials."

The method for producing a surface-treated metallic titanium material or titanium alloy material according to the present invention comprises the steps of:

(1) forming titanium nitride on the surface of a metallic titanium material or titanium alloy material; and (2) heating the metallic titanium material or titanium alloy material with titanium nitride formed on the surface thereof obtained in step (1) in an oxidizing atmosphere.

Moreover, the method for producing a surface-treated metallic titanium material or titanium alloy material according to the present invention comprises the steps of:

(1) forming titanium nitride on the surface of a metallic titanium material or titanium alloy material;

(2) anodizing the metallic titanium material or titanium alloy material with titanium nitride formed on the surface thereof obtained in step (1) in an electrolyte solution that does not have an etching effect on titanium, thereby forming a titanium oxide film; and (3) heating the metallic titanium material or titanium alloy material with a titanium oxide film formed on the surface thereof obtained in step (2) in an oxidizing atmosphere.

(1) Step of Forming Titanium Nitride

The method for producing a surface-treated metallic titanium material or titanium alloy material (titanium material) comprises the step of forming titanium nitride on the surface of a metallic titanium material or titanium alloy material.

When a titanium alloy material is used in the present invention, its type is not particularly limited. Examples of titanium alloys include Ti-6Al-4V, Ti-4.5Al-3V-2Fe-2Mo, Ti-0.5Pd, and the like. Metallic titanium material is titanium itself.

In this step, a layer of titanium nitride is formed on the surface of a titanium material to a thickness of generally about 0.1 to 100 μm, preferably about 0.5 to 50 μm, and more preferably about 1 to 10 μm.

The means for forming titanium nitride on the surface of a titanium material is not particularly limited. For example, titanium nitride is physically or chemically attached to the surface of a titanium material, or titanium and nitrogen are reacted on the surface of a titanium material to thereby form titanium nitride. Examples of such means include PVD (physical vapor deposition) treatment, CVD (chemical vapor deposition) treatment, spraying treatment (film formation by spraying), heat treatment under an ammonia gas atmosphere, heat treatment under a nitrogen gas atmosphere, and the like.

Examples of the PVD treatment include ion plating, sputtering, and the like. Examples of the CVD treatment include thermal CVD treatment, plasma CVD treatment, laser CVD treatment, and the like. Examples of the spraying treatment include flame spraying, arc spraying, plasma spraying, laser spraying, and the like.

The heating temperature of the heat treatment under ammonia gas or nitrogen gas atmosphere is preferably 500° C. or more, more preferably about 750 to 1,050° C., and even more preferably about 750° C. to 950° C. It is preferable to heat a titanium material generally at about 500° C. or more (preferably about 750° C. or more) under a nitrogen gas atmosphere.

The heat treatment under an ammonia gas or nitrogen gas atmosphere is preferably performed in the presence of an oxygen-trapping agent. The oxygen-trapping agent used in the heat treatment of a titanium material is, for example, a substance or gas having a higher oxygen affinity than that of the titanium material. For example, a carbon material, metallic powder, hydrogen gas, etc., can be used. These oxygen-trapping agents may be used singly or in a combination of two or more.

Examples of carbon materials include, but are not particularly limited to, graphite carbon, amorphous carbon, carbon having an intermediate crystal structure between graphite carbon and amorphous carbon, and the like. The carbon material may have any shape, such as plate, foil, or powder. It is preferable to use a plate carbon material, in terms of handling properties, and because the thermal strain of the titanium material during heat treatment can be prevented.

Examples of metallic powders include, but are not particularly limited to, metallic powders of titanium, a titanium alloy, chromium, a chromium alloy, molybdenum, a molybdenum alloy, vanadium, a vanadium alloy, tantalum, a tantalum alloy, zirconium, zirconium, a zirconium alloy, silicon, a silicon alloy, aluminum, an aluminum alloy, or the like.

It is preferable to use a metallic powder of titanium, a titanium alloy, chromium, a chromium alloy, zirconium, a zirconium alloy, aluminum, an aluminum alloy, or the like, because their oxygen affinity is high. The most preferable metallic powder is a metallic powder of titanium particles or a titanium alloy. These metallic powders may be used singly or in a combination of two or more.

The average particle diameter of the metallic powder is preferably about 0.1 to 1,000 μm, more preferably about 0.1 to 100 μm, and even more preferably about 0.1 to 10 μm.

The conditions for using an oxygen-trapping agent in an ammonia gas or nitrogen gas atmosphere can be suitably determined depending on the type and shape of the oxygen-trapping agent.

For example, when a carbon material or metallic powder is used as the oxygen-trapping agent, a titanium material is brought into contact with the carbon material or metallic powder so that the surface of the titanium material is covered with the carbon material or metallic powder. Then, the titanium material is heated in an ammonia gas or nitrogen gas atmosphere.

Alternatively, when hydrogen gas is used as the oxygen-trapping agent, the titanium material is heated while hydrogen gas is introduced under an ammonia gas and nitrogen gas atmosphere.

The heat treatment can be performed in an atmosphere of ammonia gas, nitrogen gas, or a mixed gas of ammonia gas and nitrogen gas. It is most preferable to use nitrogen gas, in terms of convenience, profitability, and safety.

The reaction pressure of the heat treatment under an ammonia gas or nitrogen gas atmosphere is about 0.01 to 100 MPa, preferably about 0.1 to 10 MPa, and more preferably about 0.1 to 1 MPa. The heat-treatment is preferably performed under a nitrogen gas atmosphere.

The heating time of the heat treatment under an ammonia gas or nitrogen gas atmosphere is preferably about 1 minute to 12 hours, more preferably about 10 minutes to 8 hours, and even more preferably about 1 hour to 6 hours. It is preferable to heat the titanium material for this period of time.

When a titanium material is heated under an ammonia gas or nitrogen gas atmosphere, it is preferable, in order to efficiently form titanium nitride on the surface of the titanium material, to reduce the pressure in the furnace for heat treatment using a rotary-type vacuum pump and optionally a mechanical booster pump or an oil diffusion pump, and to reduce the concentration of oxygen remaining in the furnace for heat treatment (in the nitriding furnace).

Titanium nitride can be efficiently formed on the surface of the titanium material by reducing the pressure in the furnace for heat treatment to preferably about 10 Pa or less, more preferably about 1 Pa or less, and even more preferably about 0.1 Pa or less.

Titanium nitride can be efficiently formed on the surface of a titanium material by supplying ammonia gas, nitrogen gas, or a mixed gas of ammonia gas and nitrogen gas, into the decompressed furnace to return the pressure in the furnace, and heating the titanium material. The heating temperature, heating time, and other conditions of the heat treatment using this furnace may be the same as the above-mentioned conditions. As the gas composition, it is most preferable to use nitrogen gas, in terms of convenience, profitability, and safety.

Titanium nitride can be more efficiently formed on the surface of a titanium material by alternately repeating (several tines) the decompression treatment that reduces the remaining oxygen concentration in the furnace for heat treatment, and the pressure-returning treatment that supplies nitrogen gas, etc., into the furnace.

Furthermore, titanium nitride can be more efficiently formed on the surface of a titanium material by performing decompression treatment in the presence of an oxygen-trapping agent, and heat treatment under a gas atmosphere, such as ammonia gas or nitrogen gas.

The type of titanium nitride formed on the surface of a titanium material is not particularly limited. Examples thereof include TiN, $Ti_2N$, $\alpha$-$TiN_{0.3}$, $\eta$-$Ti_3N_{2-X}$, $\zeta$-$Ti_4N_{3-X}$ (provided that X is 0 or more and less than 3), mixtures thereof, amorphous titanium nitride, and the like. Preferred among these are TiN, $Ti_2N$, and mixtures thereof; more preferred are TiN, and a mixture of TiN and $Ti_2N$; and particularly preferred is TiN.

As the means for forming titanium nitride in the present invention, one of the above methods may be used singly, or two or more of them may be used in combination. Of the above methods for forming titanium nitride, heat treatment of a titanium material under a nitrogen gas atmosphere is preferred in terms of convenience, mass production, or production cost.

(2) Step of Performing Anodization

The method for producing a surface-treated metallic titanium material or titanium alloy material comprises, if necessary, the step of anodizing the metallic titanium material or titanium alloy material with titanium nitride formed on the surface thereof in an electrolyte solution containing at least one acid selected from the group consisting of inorganic acids and organic acids, or a salt compound thereof that do not have an etching effect on titanium, thereby forming a titanium oxide film.

An amorphous titanium oxide film can be formed on the surface of the titanium material by anodizing the metallic titanium material or titanium alloy material with titanium nitride formed on the surface thereof in an electrolyte solution that does not have an etching effect on titanium.

The electrolyte solution that does not have an etching effect on titanium is preferably an electrolyte solution containing at least one compound selected from the group consisting of inorganic acids, organic acids, and salts thereof (hereafter also referred to as "an inorganic acid or the like"). The electrolyte solution containing an inorganic acid or the like is preferably a dilute aqueous solution of phosphoric acid, phosphate, or the like.

Only performing the step of anodization in the present invention does not generate spark discharges, and crystalline titanium oxide, such as anatase-type titanium oxide, is not generally formed. Anatase-type titanium oxide can be formed from amorphous titanium oxide in the subsequent heat treatment step.

Therefore, because an amorphous titanium oxide film is effectively formed on the surface of the titanium material, it is preferable to anodize the titanium material with titanium nitride formed on the surface thereof.

The presence of the step of performing anodization between the above-mentioned step of forming titanium nitride and the below-mentioned step of performing heat treatment enables the production of titanium materials having photocatalytic characteristics and photoelectric transfer characteristics, as well as excellent wear resistance and sliding properties.

The step of performing anodization in the present invention is highly safe, because strong acids (e.g., sulfuric acid) that have an etching effect on titanium are not used.

The step of performing anodization in the present invention does not require high voltage or high current, because etching accompanied by spark discharge phenomena is not performed on titanium. Accordingly, there is no need to use expensive power units that impart high current and high voltage, or to use high power associated with high current and high voltage. Thus, profitability is high.

In anodization, it is preferable to use an electrolyte solution that does not have an etching effect on titanium, in terms of convenience, profitability, safety, etc. The electrolyte solution that does not have an etching effect on titanium is preferably an electrolyte solution containing at least one compound (inorganic acid, etc.) selected from the group consisting of inorganic acids (phosphoric acid, etc.), organic acids, and salts thereof (phosphate etc.).

The inorganic acid that does not have an etching effect on titanium is preferably phosphoric acid, carbonate, or the like, in terms of convenience, profitability, safety, etc. The organic acid that does not have an etching effect on titanium is preferably acetic acid, adipic acid, lactic acid, or the like.

Salts of these acids, such as sodium dihydrogenphosphate, disodium hydrogenphosphate, sodium hydrogencarbonate, sodium acetate, potassium adipate, and sodium lactate, can also be used.

In addition, it is preferable to use an electrolyte solution containing an electrolyte, such as sodium sulfate, potassium sulfate, magnesium sulfate, sodium nitrate, potassium nitrate, magnesium nitrate, or calcium nitrate.

The most preferable inorganic acids are phosphoric acid and phosphate.

The electrolyte solution is preferably a dilute aqueous solution of an inorganic acid or the like. The concentration of the inorganic acid or the like in the electrolyte solution is preferably about 1 wt. %, in terms of profitability, etc. For example, in an electrolyte solution containing phosphoric acid, the concentration of the phosphoric acid is preferably about 0.01 to 10 wt. %, more preferably about 0.1 to 10 wt. %, and even more preferably about 1 to 3 wt. %.

These acids may be used singly, or in a combination of any two or more regardless of whether they are organic acids or inorganic acids. A preferable embodiment of an electrolyte solution containing two or more acids is, for example, an aqueous solution containing phosphate and phosphoric acid.

The proportion of the acids in this electrolyte solution varies depending on the type of salt and acid salt used, anodization conditions, and other conditions. The total amount of the acids is generally 0.01 to 10 wt. %, preferably 0.1 to 10 wt. %, and more preferably 1 to 3 wt. %.

Since the step of performing anodization in the present invention uses an electrolyte solution containing an inorganic acid or the like that does not have an etching effect on titanium, anodization can be performed under current and voltage conditions where spark discharge generation phenomena do not occur.

The step of performing anodization in the present invention is less dangerous, and does not require high current, unlike anodization accompanied by spark discharge phenomena. Further, compared to anodization accompanied by spark discharge phenomena, the step of performing anodization in the present invention can suppress an increase in the temperature of an electrolytic bath used for anodization; thus, the cost for cooling the electrolyte solution can be saved.

Therefore, compared to anodization accompanied by spark discharge phenomena, the step of performing anodization in the present invention can treat materials with a large area, and is advantageous in terms of profitability, safety, mass production, etc.

The titanium material with titanium nitride formed on the surface thereof obtained in the step of forming titanium nitride is immersed in a dilute electrolyte solution containing an inorganic acid or the like that does not have an etching effect on titanium.

Subsequently, anodization is performed by preferably applying a voltage of about 10 to 300 V. It is more preferable to perform anodization at a voltage of about 50 to 300 V, and even more preferably about 50 to 200 V.

The anodization treatment temperature is preferably about 0 to 80° C., in terms of convenience, profitability, safety, etc. It is more preferable to perform anodization at a temperature of about 10 to 50° C., and even more preferably about 20 to 30° C.

The anodization treatment time is preferably about 1 second to 1 hour. It is more preferable to perform anodization for about 10 seconds to 30 minutes, and even more preferably about 5 minutes to 20 minutes. Anodization without generating spark discharges is preferable, because treatment time is short and profitability is high.

(3) Step of Performing Heat Treatment

The method for producing a surface-treated metallic titanium material or titanium alloy material comprises the step of heating, in an oxidizing atmosphere, the metallic titanium material or titanium alloy material with titanium nitride formed on the surface thereof, or the metallic titanium material or titanium alloy material with a titanium oxide film formed on the surface thereof.

The wear resistance of the titanium material can be improved by heating the titanium material with titanium nitride formed thereon in an oxidizing atmosphere (air oxidation treatment, etc.).

When the metallic titanium material, etc., is only heated, rutile-type titanium dioxide is formed, but anatase-type titanium oxide is not formed.

In the present invention, the titanium material with titanium nitride formed thereon or the titanium material with a titanium oxide film (amorphous titanium oxide film) formed thereon (titanium material after anodization) is heated in an oxidizing atmosphere (air oxidation treatment, etc.), thereby forming an anatase-type titanium oxide film, which has excellent photocatalytic characteristics and photoelectric transfer characteristics among crystalline titanium oxides.

Thus, the titanium material after heat treatment has excellent photocatalytic characteristics or photoelectric transfer characteristics.

The oxidizing atmosphere in which heat treatment is performed may be selected from an air oxidizing atmosphere, an atmosphere of a mixture of oxygen gas and nitrogen gas having any oxygen concentration, an oxygen gas atmosphere, and the like. Heat treatment in an air oxidizing atmosphere is preferred in terms of convenience, profitability, safety, etc.

The temperature of the heat treatment in an oxidizing atmosphere is preferably about 300° C. or more, because of the improvement in wear resistance and efficient conversion from amorphous titanium oxide to anatase-type titanium oxide.

The temperature of the heat treatment in an oxidizing atmosphere is preferably about 800° C. or less, in order to prevent a phase transition from anatase-type titanium oxide to rutile-type titanium dioxide. This is because the photocatalytic characteristics and photoelectric transfer characteristics of rutile-type titanium dioxide are inferior to those of anatase-type titanium oxide.

The temperature of the heat treatment in an oxidizing atmosphere is more preferably about 300 to 800° C., even more preferably about 300 to 700° C., and particularly preferably about 400 to 700° C.

The reaction pressure of the heat treatment is about 0.01 to 10 MPa, preferably about 0.01 to 5 MPa, and more preferably about 0.1 to 1 MPa.

The heating time of the heat treatment is preferably about 1 minute to 12 hours, more preferably about 10 minutes to 8 hours, and even more preferably about 1 hour to 6 hours.

The crystalline titanium oxide film is preferably an anatase-type titanium oxide film. The energy level of the conduction band of anatase-type titanium oxide is located in a nobler position than rutile-type titanium dioxide. Accordingly, electrons excited in the conduction band of anatase-type titanium oxide efficiently contribute to the reaction, and the photocatalytic activity of anatase-type titanium oxide is higher than that of rutile-type titanium dioxide.

Moreover, open-voltage values are improved by using anatase-type titanium oxide, rather than rutile-type titanium dioxide, in a photoelectrode of a dye-sensitized solar cell; thus, the photoelectric transfer characteristics are also high. The heat treatment after the anodization of the present invention results in the formation of a film containing a large amount of anatase-type titanium oxide having high photocatalytic activity.

The heat treatment allows the production of photocatalytic materials and photoelectric conversion element materials in which a large amount of highly active anatase-type titanium oxide is formed on the surface of the titanium materials.

The photocatalytic material of the present invention can also exhibit a photocatalytic function that is much higher than that of conventional photocatalytic materials in which the substrates are coated with titanium oxide particles. Further, the photocatalytic material of the present invention can also be used as a photoelectric conversion element material that achieves high conversion efficiency.

(4) Method for Treating Surface of Metallic Titanium Material or Titanium Alloy Material The present invention also provides a method for treating the surface of a metallic titanium material or titanium alloy material.

The method for treating the surface of a metallic titanium material or titanium alloy material according to the present invention comprises the steps of:

(1) forming titanium nitride on the surface of a metallic titanium material or titanium alloy material; and (2) heating the metallic titanium material or titanium alloy material with titanium nitride formed on the surface thereof obtained in step (1) in an oxidizing atmosphere.

Moreover, the method for treating the surface of a metallic titanium material or titanium alloy material according to the present invention comprises the steps of:

(1) forming titanium nitride on the surface of a metallic titanium material or titanium alloy material; and (2) anodizing the metallic titanium material or titanium alloy material with titanium nitride formed on the surface thereof obtained in step (1) in an electrolyte solution that does not have an etching effect on titanium, thereby forming a titanium oxide film; and (3) heating the metallic titanium material or titanium alloy material with a titanium oxide film formed on the surface thereof obtained in step (2) in an oxidizing atmosphere.

The electrolyte solution that does not have an etching effect on titanium is preferably an electrolyte solution containing at least one compound selected from the group consisting of inorganic acids (phosphoric acid, etc.), organic acids, and salts thereof (phosphate, etc.).

Steps (1) to (3) are the same as steps (1) to (3) of the aforementioned method for producing a surface-treated metallic titanium material or titanium alloy material. The at least one compound selected from the group consisting of inorganic acids (phosphoric acid, etc.), organic acids, and salts thereof is preferably a compound that does not have an etching effect on titanium.

(5) Photocatalytic Material and Photoelectric Conversion Element Material

The surface-treated metallic titanium material or titanium alloy material, of the present invention can be applied to highly functional photocatalytic materials, photoelectric conversion element materials, etc. Specifically, due to their high photocatalytic activity, the surface-treated metallic titanium material or titanium alloy material of the present invention can be used as materials for decomposing toxic organic substances and inorganic substances in the vapor phase and the liquid phase.

Since hydrophilicity is imparted, the surface-treated metallic titanium material or titanium alloy material of the present invention can also be applied to medical fields, and to buildings such as indoor wall materials, building outer walls, and roof materials. Further, clue to their photoelectric transfer characteristics, the surface-treated metallic titanium material or titanium alloy material of the present invention can also be applied to photoelectrodes of dye-sensitized solar cells, which have been attracting attention as next-generation solar cells.

The surface-treated metallic titanium material or titanium alloy material of the present invention has a titanium oxide film, and thus serves as a photocatalytic material having high activity and stability.

Anatase-type titanium oxide is a photocatalyst that induces an oxidation-reduction reaction. Specifically, when anatase-type titanium oxide is irradiated with near ultraviolet rays at 400 nm or less, which corresponds to the band gap of anatase-type titanium oxide, positive holes are generated in the valence band, and electrons are generated in the conduction band, whereby an oxidation-reduction reaction occurs.

As a result of the oxidation-reduction reaction, reactive oxygen species, such as OH radicals, are generated. The active oxygen induces the oxidative degradation of organic substances, inorganic substances, etc., in the vapor phase and the liquid phase. Further, toxic metal ions are reduced by the electrons in the conduction band.

A photocatalytic reaction is a surface reaction. The more often photocatalytic materials and components to be subjected to photocatalytic reaction are brought into contact with each other, the more efficiently the photocatalytic reaction progresses. It is preferable to arrange the photocatalytic material in a bellows shape, or to use porous metallic titanium or titanium alloy to be photocatalyzed.

Moreover, since hydrophilicity is imparted by the photocatalytic effect, stains resist adherence.

Because of the anatase-type titanium oxide formed on the surface, the surface-treated metallic titanium material or titanium alloy material, of the present invention can be used as a photoelectric conversion element material, such as a photoelectrode substrate of dye-sensitized solar cells, which have been attracting attention as next-generation solar cells.

The surface-treated metallic titanium material or titanium alloy material of the present invention can be used as a wear-resistant material. The surface-treated metallic titanium material or titanium alloy material of the present invention can be used as a frictional sliding material.

Due to the excellent sliding resistance and wear resistance, the surface-treated metallic titanium material or titanium alloy material of the present invention can be used as sliding-resistant and wear-resistant materials. Sliding-resistant and wear-resistant materials are generally applied to metal molds, roll members, tools, etc. Improved wear resistance can extend the life of such metal molds, roll members, and tools.

The surface treatment method and production method of the present invention can produce materials that are useful as highly functional photocatalytic materials, photoelectric conversion element materials, etc., without the need for complicated processes or complicated handling, which are the problems of the prior art. The present invention can also produce materials having excellent sliding properties and wear resistance.

The present invention can produce materials having excellent wear resistance and sliding properties by forming titanium nitride on the surface of metallic titanium materials or titanium alloy materials, followed by heat treatment in an oxidizing atmosphere.

Further, the present invention can produce photocatalytic materials and photoelectric conversion element materials having excellent wear resistance and sliding properties by incorporating, after the formation of titanium nitride and before the heat treatment in an oxidizing atmosphere, the step of performing anodization in an electrolyte solution, such as a dilute aqueous acid solution of phosphoric acid or the like, or an aqueous solution of a salt of phosphoric acid or the like, that does not have an etching effect on titanium.

The photocatalytic material and photoelectric conversion element material of the present invention have excellent wear resistance and sliding properties, and therefore can be stably used for a long period of time even under a severe environment.

The photocatalytic material and photoelectric conversion element material of the present invention can produce materials having high corrosion resistance peculiar to titanium materials, while maintaining excellent sliding properties and wear resistance.

EXAMPLES

Examples and Comparative Examples

The present invention is described in detail below with reference to Examples; however the present invention is not limited to these Examples.

Example 1

A metallic titanium plate (titanium material) was degreased with trichloroethylene.

Using a nitriding furnace (NVF-600-PC, produced by Nakanihon-Ro Kogyo Co., Ltd.), titanium nitride was formed on the surface of the degreased metallic titanium plate.

First, the metallic titanium plate was held by a plate carbon material placed in the nitriding furnace.

Subsequently, in order to remove oxygen, the pressure in the nitriding furnace was reduced to 1 Pa or less, and then high-purity (99.99%) nitrogen gas was introduced into the nitriding furnace to return the pressure to 0.1 MPa (atmospheric pressure). By reducing the pressure in the nitriding furnace to 1 Pa or less, oxygen in the air can be removed, thereby preventing oxidation of titanium, which has a high oxygen affinity.

Then, the temperature of the nitriding furnace was raised to 950° C. for 2 hours. Thereafter, heat treatment was performed in the nitriding furnace at 950° C. for 1 hour, thereby forming titanium nitride on the surface of the metallic titanium plate.

The metallic titanium plate with titanium nitride formed on the surface thereof was immersed in a 1 wt. % phosphoric acid aqueous solution (electrolyte solution).

Then, using a function generator (HB-105, produced by Hokuto Denko Corporation) and a regulated DC power source (PU300-5, produced by Texio Technology Corporation), the voltage between an anode connected to the metallic titanium plate with titanium nitride formed on the surface thereof, and a cathode connected to the carbon material was increased at 100 mV/sec.

While the voltage was maintained at 50 V for 10 minutes, the metallic titanium plate with titanium nitride formed on the surface thereof was anodized, thereby forming a titanium oxide film.

The metallic titanium plate with a titanium oxide film formed on the surface thereof was heated (air-oxidized) in the air (in an oxidizing atmosphere) at 500° C. for 1 hour.

As a result of the above treatment, a metallic titanium plate (titanium material) with an anatase-type titanium oxide film formed on the surface thereof was produced. The surface-treated titanium material of Example 1 was prepared by a method comprising the steps of (1) forming titanium nitride, (2) performing anodization, and (3) performing heat treatment.

In the Comparative Example, a material was produced by performing anodization and air oxidation as in Example 1, except that titanium nitride was not formed on the surface of the metallic titanium plate. The surface-treated titanium material of the Comparative Example was prepared by a method comprising the steps of (2) performing anodization and (3) performing heat treatment.

The surface-treated metallic titanium plates were each cut into a size of 50×100 mm×1 mm (thickness).

Then, two of the metallic titanium plates and 3 L of acetaldehyde gas (100 ppmV) were placed in a Tedlar bag (produced by AS ONE Corporation).

The bag was irradiated with near ultraviolet rays from above using a black light (produced by Toshiba Lighting & Technology Corp.) emitting near ultraviolet rays, which caused photo-excitation of anatase-type titanium oxide, at a light intensity of 2 mW/cm$^2$. The acetaldehyde gas concentration was measured for every 15 minutes using a gas chromatograph (GC-2014, produced by Shimadzu Corporation).

FIG. 1 shows the results of Example 1.

The titanium material produced by forming titanium nitride on a titanium material, followed by anodization and heat treatment had high acetaldehyde gas degradability (open circles in FIG. 1). Thus, a titanium material having high photocatalytic activity was produced.

On the other hand, compared to the titanium material of the Example, the titanium material produced by only performing anodization and heat treatment, without forming titanium nitride on the titanium material, had lower acetaldehyde gas degradability. Thus, the photocatalytic activity was inferior (filled circles in FIG. 1).

Example 2

A metallic titanium plate was degreased with trichloroethylene.

Using a nitriding furnace (NVF-600-PC, produced by Nakanihon-Ro Kogyo Co., Ltd.), titanium nitride was formed on the surface of the degreased metallic titanium plate.

First, the metallic titanium plate was held by a plate carbon material placed in the nitriding furnace.

Subsequently, in order to remove oxygen, the pressure in the nitriding furnace was reduced to 1 Pa or less, and then high-purity (99.99%) nitrogen gas was introduced into the nitriding furnace to return the pressure to 0.1 MPa (atmospheric pressure).

Then, the temperature of the nitriding furnace was raised to 950° C. for 2 hours. Thereafter, heat treatment was performed in the nitriding furnace at 950° C. for 1 hour, thereby forming titanium nitride on the surface of the metallic titanium plate.

The metallic titanium plate with titanium nitride formed on the surface thereof was immersed in a 1 wt. % phosphoric acid aqueous solution (electrolyte solution).

Then, using a function generator (HB-105, produced by Hokuto Denko Corporation) and a regulated DC power source (PU300-5, produced by Texio Technology Corporation), the voltage between an anode connected to the metallic titanium plate with titanium nitride formed on the surface thereof and a cathode connected to the carbon material was increased at 100 mV/sec.

While the voltage was maintained at 200 V for 10 minutes, the metallic titanium plate with titanium nitride formed on the surface thereof was anodized, thereby forming a titanium oxide film.

The metallic titanium plate with a titanium oxide film formed on the surface thereof was heated (air-oxidized) in the air (in an oxidizing atmosphere) at 500° C. for 1 hour.

As a result of the above treatment, a metallic titanium plate (titanium material) with an anatase-type titanium oxide film formed on the surface thereof was produced. The surface-treated titanium material of Example 2 was prepared by a method comprising the steps of (1) forming titanium nitride, (2) performing anodization, and (3) performing heat treatment.

In the Comparative Example, a material was produced by performing anodization and air oxidation as in Example 2, except that titanium nitride was not formed on the surface of the metallic titanium plate. The surface-treated titanium material of the Comparative Example was prepared by a method comprising the steps of (2) performing anodization and (3) performing heat treatment.

The surface-treated metallic titanium plates were each cut into a size of 50×100 mm×1 mm (thickness).

Then, two of the metallic titanium plates and 3 L of acetaldehyde gas (100 ppmV) were placed in a Tedlar bag (produced by AS ONE Corporation).

The bag was irradiated with near ultraviolet rays from above using a black light (produced by Toshiba Lighting & Technology Corp.) emitting near ultraviolet rays, which caused photo-excitation of anatase-type titanium oxide, at a light intensity of 2 mW/cm$^2$. The acetaldehyde gas concentration was measured for every 15 minutes using a gas chromatograph (GC-2014, produced by Shimadzu Corporation).

Figure 2:
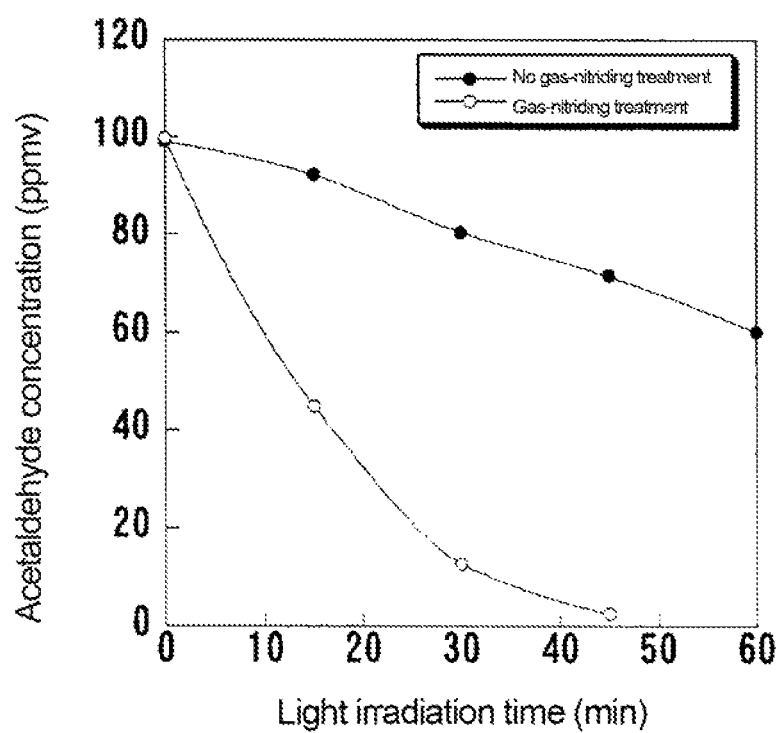
FIG. 2 shows the photocatalytic activity of the titanium material of Example 2.

FIG. 2 shows the results of Example 2.

The titanium material produced by forming titanium nitride on a titanium material, followed by anodization and heat treatment had high acetaldehyde gas degradability (open circles in FIG. 2). Thus, a titanium material having high photocatalytic activity was produced.

On the other hand, compared to the titanium material of the Example, the titanium material produced by only performing anodization and heat treatment, without forming titanium nitride on the titanium material, had lower acetaldehyde gas degradability. Thus, the photocatalytic activity was inferior (filled circles in FIG. 2).

Example 3

A metallic titanium plate (titanium material) was degreased with trichloroethylene.

Using a nitriding furnace (NVF-600-PC, produced by Nakanihon-Ro Kogyo Co., Ltd.), titanium nitride was formed on the surface of the degreased metallic titanium plate.

First, the metallic titanium plate was held by a plate carbon material placed in the nitriding furnace.

Subsequently, in order to remove oxygen, the pressure in the nitriding furnace was reduced to 1 Pa or less, and then high-purity (99.99%) nitrogen gas was introduced into the nitriding furnace to return the pressure to 0.1 MPa (atmospheric pressure).

Then, the temperature of the nitriding furnace was raised to 950° C. for 2 hours. Thereafter, heat treatment was performed in the nitriding furnace at 950° C. for 1 hour, thereby forming titanium nitride on the surface of the metallic titanium plate.

The metallic titanium plate with titanium nitride formed on the surface thereof was immersed in a 1 wt. % phosphoric acid aqueous solution (electrolyte solution).

Then, using a function generator (HB-105, produced by Hokuto Denko Corporation) and a regulated DC power source (PU300-5, produced by Texio Technology Corporation), the voltage between an anode connected to the metallic titanium plate with titanium nitride formed on the surface thereof and a cathode connected to the carbon material was increased at 100 mV/sec.

While the voltage was maintained at 50 V for 10 minutes, the metallic titanium plate with titanium nitride formed on the surface thereof was anodized, thereby forming a titanium oxide film.

The metallic titanium plate with a titanium oxide film formed on the surface thereof was heated (air-oxidized) in the air (in an oxidizing atmosphere) at 600° C. for 1 hour.

As a result of the above treatment, a metallic titanium plate (titanium material) with an anatase-type titanium oxide film formed on the surface thereof was produced. The surface-treated titanium material of Example 3 was prepared by a method comprising the steps of (1) forming titanium nitride, (2) performing anodization, and (3) performing heat treatment.

In the Comparative Example, a material was produced by performing anodization and air oxidation as in Example 3, except that titanium nitride was not formed on the surface of the metallic titanium plate. The surface-treated titanium material of the Comparative Example was prepared by a method comprising the steps of (2) performing anodization and (3) performing heat treatment.

The metallic titanium plates (titanium materials) were each cut into a size of 50×100 mm×1 mm (thickness).

Then, two of the metallic titanium plates and 3 L of acetaldehyde gas (100 ppmV) were placed in a Tedlar bag (produced by AS ONE Corporation).

The bag was irradiated with near ultraviolet rays from above using a black light (produced by Toshiba Lighting & Technology Corp.) emitting near ultraviolet rays, which caused photo-excitation of anatase-type titanium oxide, at a light intensity of 2 mW/cm$^2$. The acetaldehyde gas concentration was measured for every 15 minutes using a gas chromatograph (GC-2014, produced by Shimadzu Corporation).

Figure 3:
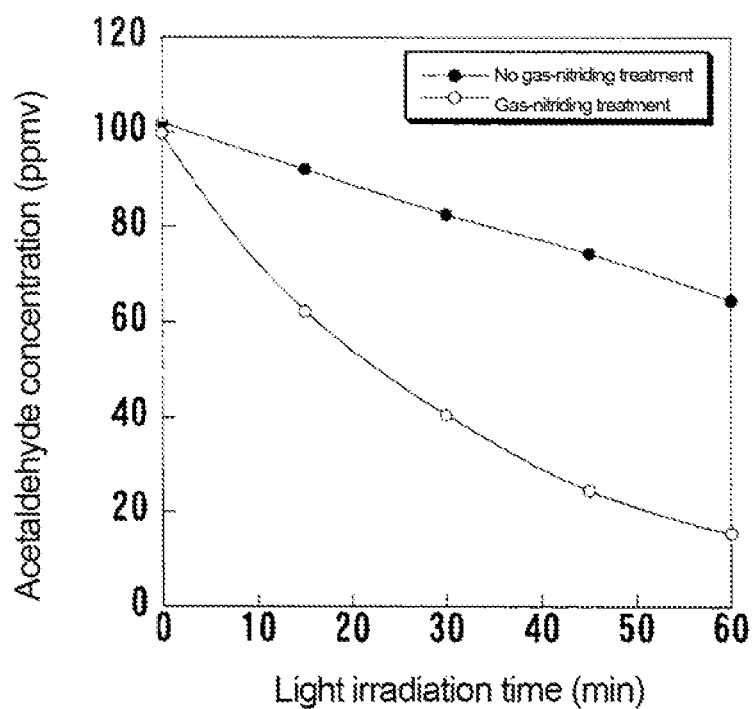
FIG. 3 shows the photocatalytic activity of the titanium material of Example 3.

FIG. 3 shows the results of Example 3.

The titanium material produced by forming titanium nitride on a titanium material, followed by anodization and heat treatment had high acetaldehyde gas degradability (open circles in FIG. 3). Thus, a titanium material having high photocatalytic activity was produced.

On the other hand, compared to the titanium material of the Example, the titanium material produced by only performing anodization and heat treatment, without forming titanium nitride on the titanium material, had lower acetaldehyde gas degradability. Thus, the photocatalytic activity was inferior (filled circles in FIG. 3).

Example 4

A metallic titanium plate (titanium material) was degreased with trichloroethylene.

Using a nitriding furnace (NVF-600-PC, produced by Nakanihon-Ro Kogyo Co., Ltd.), titanium nitride was formed on the surface of the degreased metallic titanium plate.

First, the metallic titanium plate was held by a plate carbon material placed in the nitriding furnace.

Subsequently, in order to remove oxygen, the pressure in the nitriding furnace was reduced to 1 Pa or less, and then high-purity (99.99%) nitrogen gas was introduced into the nitriding furnace to return the pressure to 0.1 MPa (atmospheric pressure).

Then, the temperature of the nitriding furnace was raised to 950° C. for 2 hours. Thereafter, heat treatment was performed in the nitriding furnace at 950° C. for 1 hour, thereby forming titanium nitride on the surface of the metallic titanium plate.

The metallic titanium plate with titanium nitride formed on the surface thereof was immersed in a 1 wt. % phosphoric acid aqueous solution (electrolyte solution).

Then, using a function generator (HB-105, produced by Hokuto Denko Corporation) and a regulated DC power source (PU300-5, produced by Texio Technology Corporation), the voltage between an anode connected to the metallic titanium plate with titanium nitride formed on the surface thereof and a cathode connected to the carbon material was increased at 100 mV/sec.

While the voltage was maintained at 200 V for 10 minutes, the metallic titanium plate with titanium nitride formed on the surface thereof was anodized, thereby forming a titanium oxide film.

The metallic titanium plate with a titanium oxide film formed on the surface thereof was heated (air-oxidized) in the air (in an oxidizing atmosphere) at 500° C. for 1 hour.

As a result of the above treatment, a metallic titanium plate (titanium material) with an anatase-type titanium oxide film formed on the surface thereof was produced. The surface-treated titanium material of Example 4 was prepared by a method comprising the steps of (1) forming titanium nitride, (2) performing anodization, and (3) performing heat treatment.

In the Comparative Example, a material was produced by performing anodization and air oxidation as in Example 4, except that titanium nitride was not formed on the surface of the metallic titanium plate. The surface-treated titanium material of the Comparative Example was prepared by a method comprising the steps of (2) performing anodization and (3) performing heat treatment.

The hydrophilicity of the surface-treated metallic titanium plates was measured according to JIS R 1703-1 (Test method for self-cleaning performance of photocatalytic materials—Part 1: Measurement of water contact angle).

Specifically, the metallic titanium plate was irradiated with near ultraviolet rays from above using a black light (produced by Toshiba Lighting & Technology Corp.) emitting near ultraviolet rays, which caused photo-excitation of anatase-type titanium oxide, at a light intensity of 2.2 mW/cm$^2$.

Then, distilled water was added dropwise to the surface-treated metallic titanium plate, and the water contact angle of the sample surface, i.e., the contact angle of the surface-treated metallic titanium plate with the distilled water, was measured using a contact angle meter (CA-X, produced by Kyowa Interface Science Co., Ltd.).

Table 1 shows the results of Example 4. When titanium nitride was formed on titanium materials, followed by anodization and heat treatment, the contact angle with water after light irradiation for one hour was about 5 degrees, indicating high hydrophilicity.

TABLE 1

Measurement of water contact angle

| Light irradiation time (hour) | Comparative Example No gas-nitriding treatment | Example 4 Gas-nitriding treatment |
| --- | --- | --- |
| 1 | 59.5 | 5.8 |
| 2 | 55.2 | 4.7 |

Example 5

A metallic titanium plate (titanium material) was degreased with trichloroethylene.

Using a nitriding furnace (NVF-600-PC, produced by Nakanihon-Ro Kogyo Co., Ltd.), titanium nitride was formed on the surface of the degreased metallic titanium plate.

First, the metallic titanium plate was held by a plate carbon material placed in the nitriding furnace.

Subsequently, in order to remove oxygen, the pressure in the nitriding furnace was reduced to 1 Pa or less, and then high-purity (99.99%) nitrogen gas was introduced into the nitriding furnace to return the pressure to 0.1 MPa (atmospheric pressure).

Then, the temperature of the nitriding furnace was raised to 950° C. for 2 hours. Thereafter, heat treatment was performed in the nitriding furnace at 950° C. for 1 hour, thereby forming titanium nitride on the surface of the metallic titanium plate.

The metallic titanium plate with titanium nitride formed on the surface thereof was immersed in a 1 wt. % phosphoric acid aqueous solution (electrolyte solution).

Then, using a function generator (HB-105, produced by Hokuto Denko Corporation) and a regulated DC power source (PU300-5, produced by Texio Technology Corporation), the voltage between an anode connected to the metallic titanium plate with titanium nitride formed on the surface thereof and a cathode connected to the carbon material was increased at 100 mV/sec.

While the voltage was maintained at 200 V for 10 minutes, the metallic titanium plate with titanium nitride formed on the surface thereof was anodized, thereby forming a titanium oxide film.

The metallic titanium plate with a titanium oxide film formed on the surface thereof was heated (air-oxidized) in the air (in an oxidizing atmosphere) at 500° C. for 1 hour.

As a result of the above treatment, a metal titanium plate (titanium material) with an anatase-type titanium oxide film formed on the surface thereof was produced. The surface-treated titanium material of Example 4 was prepared by a method comprising the steps of (1) forming titanium nitride, (2) performing anodization, and (3) performing heat treatment.

A dye-sensitized solar cell using the surface-treated metallic titanium plate as a photoelectrode was produced.

Then, the photoelectric transfer characteristics of the dye-sensitized solar cell were examined.

First, the surface-treated metallic titanium plate was cut into a size of 8×60 mm×1 mm (thickness). Subsequently, the sample surface of the metallic titanium plate was washed.

Then, the metallic titanium plate was coated with a titania material (a mixture of PST-18NR/PST-400C, produced by JGC Catalysts and Chemicals Ltd.) by a squeegee method so that the coated area was 0.5 cm$^2$ (1.25 mm×40 mm).

The metallic titanium plate was then fired at 450° C. for 1 hour. Subsequently, ruthenium-based dye (N719, produced by Solaronix) was diluted in a mixture of tert-butanol (t-BtOH) and acetonitrile ($CH_3CN$) to prepare a dye solution. The mixing ratio of t-BtOH to $CH_3CN$ in the mixture was 1:1. The concentration of ruthenium-based dye was 0.3 mM.

The metallic titanium plate after firing was immersed in the dye solution at 40° C. for 14 hours, thereby obtaining a photoelectrode material.

A material obtained by the electron beam deposition of platinum on FTO glass (produced by Asahi Glass Co., Ltd.) was used as the counter electrode. The thickness of the deposited platinum was 1 nm, and the size of the material was 8×60 mm×1.8 mm (thickness).

A 30-μm-thick spacer was disposed between the photoelectrode material and the counter electrode material so as to prevent contact between the photoelectrode material and the counter electrode material.

The space between the electrodes was filled with an electrolyte solution prepared by dissolving 0.01 M $I_2$ (iodine), 0.02 M LiI (lithium iodide), 0.24 M DMPII (1,2-dimethyl-3-propylimidazolium iodide), and 1.0 M TBP (tert-butylpyridine) in acetonitrile.

Subsequently, the gap between both electrodes was sealed with UV-cured resin (TB3017B, produced by ThreeBond), thereby producing a dye-sensitized solar cell.

Artificial sunlight was applied from the counter electrode side using a xenon lamp at a light intensity of 100 mW/cm$^2$.

Table 2 shows the results of Example 5 (I-V characteristics).

A titanium material having photoelectric transfer characteristics was produced by forming titanium nitride on the titanium material, followed by anodization and heat treatment.

TABLE 2

I-V characteristics of dye-sensitized solar cell (photoelectrode material: surface-treated titanium material of Example 5)

| Short-circuit current density (mA/cm$^2$) | Open voltage (V) | Fill factor | Photoelectric conversion efficiency (%) |
|---|---|---|---|
| 11.18 | 0.746 | 0.719 | 6.02 |

Example 6

A metallic titanium plate (titanium material) was degreased with trichloroethylene.

Using a nitriding furnace (NVF-600-PC, produced by Nakanihon-Ro Kogyo Co., Ltd.), titanium nitride was formed on the surface of the degreased metallic titanium plate.

First, the metallic titanium plate was held by a plate carbon material placed in the nitriding furnace.

Subsequently, in order to remove oxygen, the pressure in the nitriding furnace was reduced to 1 Pa or less, and then high-purity (99.99%) nitrogen gas was introduced into the nitriding furnace to return the pressure to 0.1 MPa (atmospheric pressure).

Then, the temperature of the nitriding furnace was raised to 950° C. for 2 hours. Thereafter, heat treatment was performed in the nitriding furnace at 950° C. for 1 hour, thereby forming titanium nitride on the surface of the metallic titanium plate.

The metallic titanium plate with titanium nitride formed on the surface thereof was immersed in a 1 wt. % phosphoric acid aqueous solution (electrolyte solution).

Then, using a function generator (HB-105, produced by Hokuto Denko Corporation) and a regulated DC power source (PU300-5, produced by Texio Technology Corporation), the voltage between an anode connected to the metallic titanium plate with titanium nitride formed on the surface thereof and a cathode connected to the carbon material was increased at 100 mV/sec.

While the voltage was maintained at 200 V for 10 minutes, the metallic titanium plate with titanium nitride formed on the surface thereof was anodized, thereby forming a titanium oxide film.

The metallic titanium plate with a titanium oxide film formed on the surface thereof was heated (air-oxidized) in the air (in an oxidizing atmosphere) at 400° C., 500° C., 600° C., or 700° C. for 1 hour.

As a result of the above treatment, a metallic titanium plate (titanium material) with an anatase-type titanium oxide film formed on the surface thereof was produced. The surface-treated titanium material of Example 5 was prepared by a method comprising the steps of (1) forming titanium nitride, (2) performing anodization, and (3) performing heat treatment.

In the Comparative Example, a material was produced by performing anodization and air oxidation as in Example 6, except that titanium nitride was not formed on the surface of the metallic titanium plate. The surface-treated titanium material of the Comparative Example was prepared by a method comprising the steps of (2) performing anodization and (3) performing heat treatment.

The amounts of anatase-type titanium oxide and rutile-type titanium dioxide formed on the surface of the titanium materials were measured at an X-ray incident angle of 1° using an X-ray diffractometer (RINT-2500, produced by Rigaku Corporation).

Table 3 shows the results of Example 6 (the amount of titanium oxide crystals formed).

Even when the air oxidation temperature was 400° C. (low temperature), anatase-type titanium oxide was formed on the surface of a titanium material by forming titanium nitride on the titanium material, followed by anodization and heat treatment.

The amount of rutile-type titanium dioxide converted from anatase-type titanium oxide was reduced particularly by setting the air oxidation temperature at 600° C. and 700° C.

When air oxidation treatment was performed at 400 to 700° C. for 1 hour after the gas-nitriding treatment and anodization, a large amount of anatase-type titanium oxide having high photocatalytic characteristics and photoelectric transfer characteristics was formed.

TABLE 3

Amount of titanium oxide crystals formed on titanium material surface

| Nitriding treatment | Air oxidation temperature (° C.) | XRD integrated intensity | |
|---|---|---|---|
| | | Anatase-type 101 surface | Rutile-type 110 surface |
| Example 6 Nitriding treatment | 400 | 663 | Undetected |
| | 500 | 768 | 19 |
| | 600 | 870 | 77 |
| | 700 | 941 | 324 |

TABLE 3-continued

Amount of titanium oxide crystals formed on titanium material surface

| Nitriding treatment | Air oxidation temperature (° C.) | XRD integrated intensity | |
|---|---|---|---|
| | | Anatase-type 101 surface | Rutile-type 110 surface |
| Comparative Example No nitriding treatment | 400 | Undetected | Undetected |
| | 500 | 591 | Undetected |
| | 600 | 559 | 363 |
| | 700 | 632 | 846 |

Example 7

A metallic titanium plate (titanium material) was degreased with trichloroethylene.

Using a nitriding furnace (NVF-600-PC, produced by Nakanihon-Ro Kogyo Co., Ltd.), titanium nitride was formed on the surface of the degreased metallic titanium plate.

First, the metallic titanium plate was held by a plate carbon material placed in the nitriding furnace.

Subsequently, in order to remove oxygen, the pressure in the nitriding furnace was reduced to 1 Pa or less, and then high-purity (99.99%) nitrogen gas was introduced into the nitriding furnace to return the pressure to 0.1 MPa (atmospheric pressure).

Then, the temperature of the nitriding furnace was raised to 950° C. for 2 hours. Thereafter, heat treatment was performed in the nitriding furnace at 950° C. for 1 hour, thereby forming titanium nitride on the surface of the metallic titanium plate.

The metallic titanium plate with titanium nitride formed on the surface thereof was immersed in a 1 wt. % phosphoric acid aqueous solution (electrolyte solution).

Then, using a function generator (HB-105, produced by Hokuto Denko Corporation) and a regulated DC power source (PU300-5, produced by Texio Technology Corporation), the voltage between an anode connected to the metallic titanium plate with titanium nitride formed on the surface thereof and a cathode connected to the carbon material was increased at 100 mV/sec.

While the voltage was maintained at 200 V for 10 minutes, the metallic titanium plate with titanium nitride formed on the surface thereof was anodized, thereby forming a titanium oxide film.

The metallic titanium plate with a titanium oxide film formed on the surface thereof was heated (air-oxidized) in the air (in an oxidizing atmosphere) at 100° C., 200° C., 300° C., 400° C., 500° C., 600° C., or 700° C. for 1 hour.

As a result of the above treatment, a metallic titanium plate (titanium material) with an anatase-type titanium oxide film formed on the surface thereof was produced. The surface-treated titanium material of Example 7 was prepared by a method comprising the steps of (1) forming titanium nitride, (2) performing anodization, and (3) performing heat treatment.

In the Comparative Example, a material was produced by performing anodization and air oxidation as in Example 7, except that titanium nitride was not formed on the surface of the metallic titanium plate. The surface-treated titanium material of the Comparative Example was prepared by a method comprising the steps of (2) performing anodization and (3) performing heat treatment.

These surface-treated metallic titanium plates were subjected to an abrasion test using an Ogoshi-type abrasion tester (produced by Tokyo Testing Machine Inc.).

Specifically, a S45C (carbon steel for mechanical structure) ring was brought into contact with the surface-treated metallic titanium plate, and rotated at a rate of 1 m/sec for 10 minutes. The wear loss of the surface-treated metallic titanium plate generated by the rotation was measured using a surface profilometer (produced by Taylor Hobson), and wear resistance was evaluated.

Figure 4:
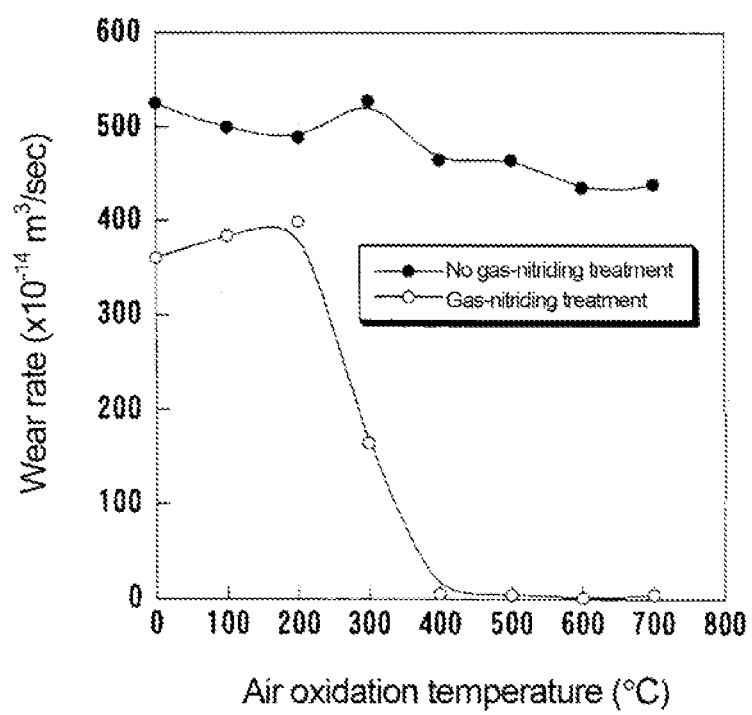
FIG. 4 shows the wear resistance of the titanium material of Example 7.

FIG. 4 shows the results of Example 7.

The titanium material produced by forming titanium nitride on a titanium material, followed by anodization and heat treatment had high wear resistance (open circles in FIG. 4). Thus, a titanium material having high wear resistance was produced.

In particularly, the wear resistance was increased by performing heat treatment by air oxidation at 300° C. to 700° C. for 1 hour after gas-nitriding treatment and anodization.

On the other hand, compared to the titanium material of the Example, the titanium material produced by performing anodization and heat treatment, without forming titanium nitride on the titanium material, had inferior wear resistance (filled circles in FIG. 4). The wear resistance was not improved even by heating the titanium material by air oxidation after anodization.

Example 8

A metallic titanium plate (titanium material) was degreased with trichloroethylene.

Using a nitriding furnace (NVF-600-PC, produced by Nakanihon-Ro Kogyo Co., Ltd.), titanium nitride was formed on the surface of the degreased metallic titanium plate.

First, the metallic titanium plate was held by a plate carbon material placed in the nitriding furnace.

Subsequently, in order to remove oxygen, the pressure in the nitriding furnace was reduced to 1 Pa or less, and then high-purity (99.99%) nitrogen gas was introduced into the nitriding furnace to return the pressure to 0.1 MPa (atmospheric pressure).

Then, the temperature of the nitriding furnace was raised to 950° C. for 2 hours. Thereafter, heat treatment was performed in the nitriding furnace at 950° C. for 1 hour, thereby forming titanium nitride on the surface of the metallic titanium plate.

The metallic titanium plate with titanium nitride formed on the surface thereof was heated (air-oxidized) in the air (in an oxidizing atmosphere) at 100° C., 200° C., 300° C., 400° C., 500° C., 600° C., or 700° C. for 1 hour.

The surface-treated titanium material of Example 8 was prepared by a method comprising the steps of (1) forming titanium nitride and (3) performing heat treatment.

In the Comparative Example, a material was produced by performing air oxidation as in Example 8, except that titanium nitride was not formed on the surface of the metallic titanium plate. The surface-treated titanium material of the Comparative Example was prepared by a method comprising the step of (3) performing heat treatment.

These surface-treated metallic titanium plates were subjected to an abrasion test using an Ogoshi-type abrasion tester (produced by Tokyo Testing Machine Inc.).

Specifically, an S45C (carbon steel for mechanical structure) ring was brought into contact with the surface-treated metallic titanium plate, and rotated at a rate of 1 m/sec for 10 minutes. The wear loss of the surface-treated metallic titanium plate generated by the rotation was measured using a surface profilometer (produced by Taylor Hobson), and wear resistance was evaluated.

Figure 5:
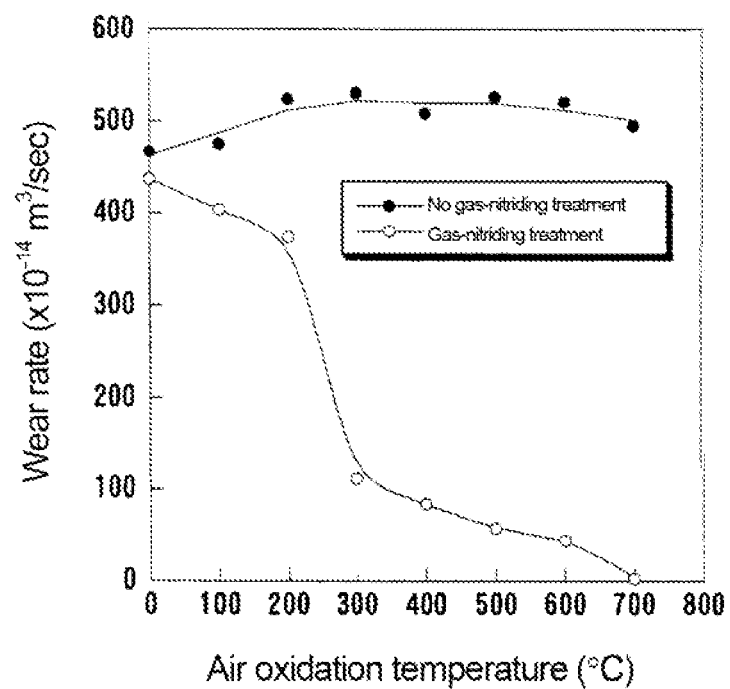
FIG. 5 shows the wear resistance of the titanium material of Example 8.

FIG. 5 shows the results of Example 8.

The titanium material produced by forming titanium nitride on a titanium material, followed by heat treatment had high wear resistance (open circles in FIG. 5). Thus, a titanium material having high wear resistance was produced.

In particular, the wear resistance was increased by performing heat treatment by air oxidation at 300° C. to 700° C. for 1 hour after gas-nitriding treatment.

On the other hand, compared to the titanium material of the Example, the titanium material produced by performing heat treatment, without forming titanium nitride on the titanium material, had inferior wear resistance (filled circles in FIG. 5). The wear resistance was not improved even by heating the titanium material by air oxidation.

The invention claimed is:

1. A method for producing photocatalytic materials, photoelectric conversion element materials, slide-resistant materials, or wear-resistant materials, a surface-treated metallic titanium material or titanium alloy material the method comprising the steps of:
   (1) forming titanium nitride on the surface of a metallic titanium material or a titanium alloy material by heat treating said material in a nitrogen atmosphere at a heating temperature of 750° C. or more, wherein the heat treatment is performed in the presence of a carbon oxygen-trapping agent, at a reaction pressure of 0.1 to 1 MPa for 10 minutes to 8 hours wherein said heat treating comprises the further steps of
   (i) reducing the pressure in the furnace for heat treatment using a rotary-type vacuum pump, a mechanical booster pump, and an oil diffusion pump, reducing the concentration of oxygen remaining in the furnace for heat treatment to 0.1 Pa or less,
   (ii) supplying nitrogen gas into the decompressed furnace to return the pressure in the furnace and heating the titanium material, and then alternately repeating steps (i) and (ii) at least once;
   (2) anodizing the metallic titanium material or titanium alloy material with the titanium nitride formed on the surface thereof obtained in step (1) by applying a voltage of 50 to 300 V in an electrolyte solution that does not have an etching effect on titanium, thereby forming a titanium oxide film wherein the anodizing treatment temperature is 10 to 50° C. for a period of 5 to 20 minutes; and
   (3) heating the metallic titanium material or titanium alloy material with the titanium oxide film formed on the surface thereof obtained in step (2) at a temperature of 400° C. to 700° C. in an atmosphere selected from an air oxidizing atmosphere, an atmosphere of a mixture of oxygen gas and nitrogen gas, and an oxygen gas atmosphere at a pressure of 0.01 to 5 MPa for a period of 1 to 6 hours; and wherein the titanium oxide film formed by anodization is a crystalline titanium oxide film and the crystalline titanium oxide film is an anatase-type titanium oxide film.

2. The production method according to claim 1, wherein the electrolyte solution that does not have an etching effect on titanium used in anodization is an electrolyte solution containing at least one compound selected from the group consisting of inorganic acids, organic acids, and salts thereof.

3. The production method according to claim 2, wherein the at least one compound selected from the group consisting of inorganic acids, organic acids, and salts thereof is at least one compound selected from the group consisting of phosphoric acid and a phosphate.

* * * * *